United States Patent
Umeki et al.

(10) Patent No.: US 6,555,751 B1
(45) Date of Patent: Apr. 29, 2003

(54) STRAIGHT JOINT FOR CABLE

(75) Inventors: Takeshi Umeki, Nagoya (JP);
Yoshihiro Jizou, Tokyo (JP);
Yoshihumi Itabashi, Tokyo (JP);
Ichirou Kume, Kumagaya (JP);
Kenichi Andou, deceased, late of Osaka (JP), by Hiroshi Ikushima, legal representative; Katsuteru Asahi, Kumagaya (JP); Shinji Katoh, Kumagaya (JP); Kouji Miura, Kumagaya (JP); Ryuichi Okai, Kumagaya (JP); Shizuo Maeda, Kumagaya (JP)

(73) Assignee: Central Japan Railway Company (JP)

( * ) Notice: Subject to any disclaimer, the term of this patent is extended or adjusted under 35 U.S.C. 154(b) by 0 days.

(21) Appl. No.: 09/719,248

(22) PCT Filed: Apr. 7, 2000

(86) PCT No.: PCT/JP00/02283
§ 371 (c)(1),
(2), (4) Date: Jul. 23, 2001

(87) PCT Pub. No.: WO00/62391
PCT Pub. Date: Oct. 19, 2000

(30) Foreign Application Priority Data

Apr. 9, 1999 (JP) ............................................. 11-103135

(51) Int. Cl.⁷ ................................................ H02G 15/02
(52) U.S. Cl. ..................................................... 174/75 R
(58) Field of Search ............................. 174/75 R, 73.1, 174/88 R, 84 R

(56) References Cited

FOREIGN PATENT DOCUMENTS

| JP | 44-11006 | 5/1969 |
| JP | 2-49323 | 4/1990 |
| JP | 2-104727 | 8/1990 |
| JP | 3-54324 | 5/1991 |
| JP | 4-47342 | 4/1992 |

*Primary Examiner*—Chau N. Nguyen
(74) *Attorney, Agent, or Firm*—Finnegan, Henderson, Farabow, Garrett & Dunner, LLP

(57) ABSTRACT

The center component 18a around the connector 2 is made of an insulating material such as synthetic resin, and there is a middle flange 19 formed around its middle section that protrudes outward in the radial direction around its entire circumference. There are insulating-tube side flanges 21, 21 that are formed around the opening ends of external semiconductive layers 13a, 13a of the insulating tubes 20a, 20a at the ends of the cables 4, 4, respectively. These insulating-tube side flanges 21, 21, are connected and joined to the middle flange 19 with O-rings 25, 25 therebetween.

1 Claim, 5 Drawing Sheets

Prior Art

STRAIGHT JOINT FOR CABLE

FIELD OF THE INVENTION

This invention relates to a linear cable-connector, and more particularly to a linear cable-connector which connects the ends of a pair of cables such as electric power cables that supply electric power to various mechanical equipment.

DESCRIPTION OF THE BACKGROUND

In order to supply electric power to units that are separated by a long distance from the power supply, it is necessary to connect several cables together in series with a connector. Also, when these cables are laid outdoors, it is necessary to adequately maintain the water proofing of the connector for these pairs of cables. A linear cable connector that is used for this purpose has been disclosed, for example, in Japanese Utility Model Resistration No. 2579115.

FIG. 5 shows one example of the conventional linear cable connector that is e.g. presented in that disclosure. This linear cable connector 1 has a connection terminal 2 in the center in the middle part of the connector 1 in the axial direction. This connection terminal 2 is made of metal such as copper or copper alloy that has good conductivity, and it is formed in a cylindrical shape such that the outer diameter in the middle section is small while the outer diameter at both ends is large, and there are connection holes 3, 3 having a circular cross section and an opening on both ends in the axial direction. It is not shown in the figures, however there is metallic plate with good conductivity formed around the inner peripheral surface of these connection holes 3, 3 to form contact terminals in a well-known structure.

Moreover, a pair of cables 4, 4 to be connected have conductors 5, 5, and the portions on the ends of the conductors 5, 5 that are exposed from the insulating coverings 6, 6 of the cables 4, 4 are securely connected to the base ends of plugs 7, 7, and connection tubes 8, 8 are formed on these base ends. These plugs 7, 7 are formed in a cylindrical shape from a metal having good conductivity, so by compressing the connection tubes 8, 8 inward in the radial direction after the ends of the aforementioned conductors 5, 5 have been inserted into these connection tubes 8, 8, they are securely fastened to the ends of the conductors 5, 5. Also, the tip ends of the plugs 7, 7 are inserted in the respective connection holes 3, 3, and make contact with the connection terminal 2 by way of the aforementioned contact terminals. The portion from the end of the insulating coverings 6, 6 to the base end of the plugs 7, 7 is covered by the base half of internal semiconductive layers 9, 9. The tip ends of these internal semiconductive layers 9, 9 are cylindrical-shaped sections 10, 10, and there are ring-shaped gaps formed between the inner peripheral surfaces of these cylindrical-shaped sections 10, 10 and the outer peripheral surfaces in the middle of the plugs 7, 7.

Moreover, the center component 18, made of an insulating material such as synthetic resin, is formed by molding such that it covers all the way around the circumference of the connection element 2. The inner diameter of this center component 18 is small in the middle portion and large on both ends. This center component 18 is joined with the aforementioned connection element 2 such that they do not shift each other. The outer peripheral surface of this center component 18 is tapered in a direction such that the radius becomes smaller in the direction toward both ends, and the center section has a cylindrical surface. In addition, a pair of engagement protrusions 11, 11 with trapezoidal cross-sections are formed all the way around the center section such that they are separated from each other in the axial direction.

Furthermore, insulating layers 12, 12 made of synthetic resin or the like are formed around the ends of the cables 4, 4, around the internal semiconductive layers 9, 9 and around plugs 7, 7, respectively. The inner peripheral surface on the tip half of the insulating layers 12, 12, as well as the inner peripheral surface of the cylindrical sections 10, 10 formed on the tip half of the internal semiconductive layers 9, 9 are conical concave tapered surfaces that come in close contact with the outer peripheral surfaces of both ends of the aforementioned center component 18. Also, external semiconductive layers 13, 13 made of an elastic material such as rubber are formed around these insulating layers 12, 12. These external semiconductive layers 13, 13, the insulating layers 12, 12 and the internal semiconductive layers 9, 9 come together to form insulating tubes 20, 20.

Also, the portions that protrude from the tip ends of the insulating layers 12, 12 on the tip ends of the external semiconductive layers 13, 13 are fitting tubes 14, 14. Engagement grooves 15, 15 that are formed on the inner peripheral surface of these fitting tubes 14, 14 fit tightly with the aforementioned engagement protrusions 11, 11. In addition, the outer peripheral surfaces of these fitting tubes 14, 14 are held by retaining bands 16, 16 such that the engagement grooves 15, 15 and the engagement protrusions 11, 11 do not accidentally come apart. Furthermore, by winding insulating tape between the base ends of the external semiconductive layers 13, 13 and the outer peripheral surfaces of the cables 4, 4, insulating coverings 17, 17 are formed. It is possible for the formation positions of the engagement grooves 15, 15 and the engagement protrusions 11, 11 to be opposite, as shown in FIG. 6.

In the case of the prior art construction described above, disassembly and reconnection are simple, however, water proofing is not always adequate. In other words, when the linear cable connector 1 is installed in a location where it is exposed to wind and rain, rain water that enters the connector 1 from the pair of abutting surfaces of the fitting tubes 14, 14 passes through the small gap between the inner peripheral surface of the insulating layers 12, 12 and the outer peripheral surface of the center component 18, and gets inside these insulating layers 12, 12, and there is a possibility that it will cause poor insulation.

Taking the above problem into consideration, the objective of this invention is to provide a linear cable connector that is constructed such that it can be disassembled or reconnected easily, and such that it is capable of maintaining stable insulating performance over a long period of time even under severe conditions of use.

DISCLOSURE OF THE INVENTION

Similar to the linear cable connector described above in the prior art, the linear cable connector of this invention comprises: connection terminals that are made of conductive material and formed with connection holes on both ends in the axial direction that open up on both ends; plugs that are made of conductive material and that have tip ends inserted into the aforementioned connection holes, and base ends securely fastened to the ends of conductive members forming a pair of cables to be connected; a center component that is made of insulating material and that is provided all the way around the aforementioned connection terminals such that it covers the connection terminals on the circumference thereof; and a pair of insulating tubes that are provided around the ends of the cables and around the plugs, such that the both ends of the center component can be freely inserted into the openings on the respective ends. Moreover, the opening ends of this pair of insulating tubes are joined together at the middle section of the center component.

Particularly, the linear cable connector of this invention comprises side flanges that are formed all the way around the opening ends of the insulating tubes. These side flanges of the insulating tubes are fastened together with a seal ring located between the abutting flange surfaces.

Moreover, as necessary, a middle flange can be located generally around the outer peripheral surface in the middle of the center component such that it protrudes outward in the radial direction. The aforementioned middle flange can then be held between the abutting surfaces of the side flanges on both of the insulating cylinders with seal rings interposed, and further, the side flanges on both of the insulating tubes can be fastened to the aforementioned middle flange.

The linear cable connector of this invention, constructed as described above, can be effectively sealed with a seal ring between the abutting surfaces or pair of side flanges on the insulating tubes,.or with seal rings between both surfaces of the middle side flange and the side surfaces of the side flanges on both of the insulating tubes. Also, disassembly or reconnection can be performed easily by separating or connecting the side flanges on the insulating tubes, or by separating or connecting the surfaces of the middle flange from the side surfaces of both of the side flanges on the insulating tubes.

1, 1a: Linear cable connector, 2: Connection terminal, 3: Connection hole, 4: Cable, 5: Conductor, 6: Insulating covering, 7: Plug, 8: Connection tube, 9: Internal semiconductive layer, 10: Cylindrical-shaped section, 11: Engagement protrusions, 12: Insulating layer, 13, 13a: External semiconductive layer, 14: Fitting tubes, 15: Engagement groove, 16: Retaining band, 17: Insulating covering, 18, 18a: Center component, 19: Middle flange, 20, 20a: Insulating tube, 21, 21a: Insulating-tube side flange, 22: Bolt, 23: Nut, 24: Attachment groove, 25: O-ring.

THE BEST EMBODIMENT FOR WORKING THE INVENTION

Figure 1:
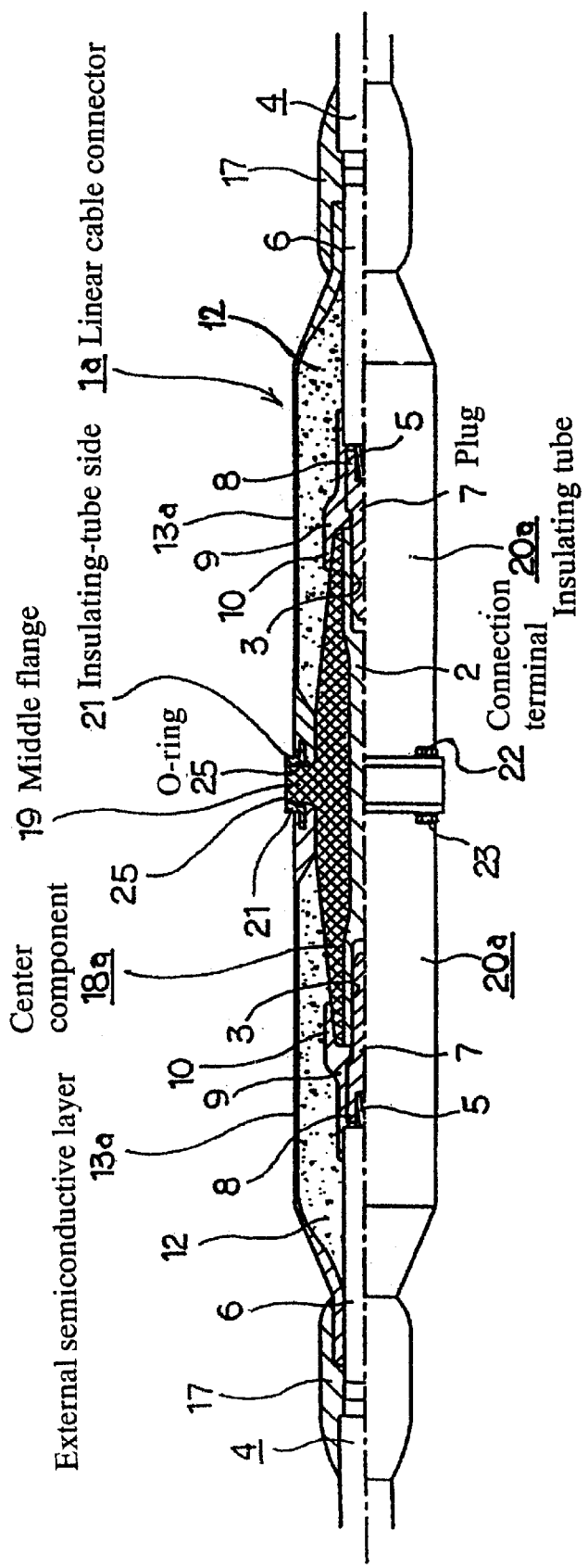
FIG. 1 is a cross-sectional drawing of one embodiment of the invention.
Figure 2:
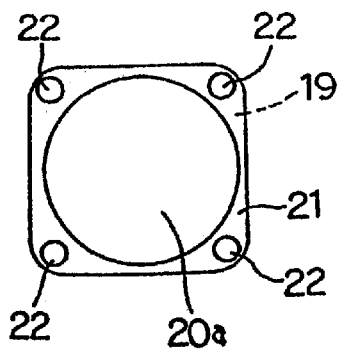
FIG. 2 is an abbreviated side view of FIG. 1.
Figure 3:
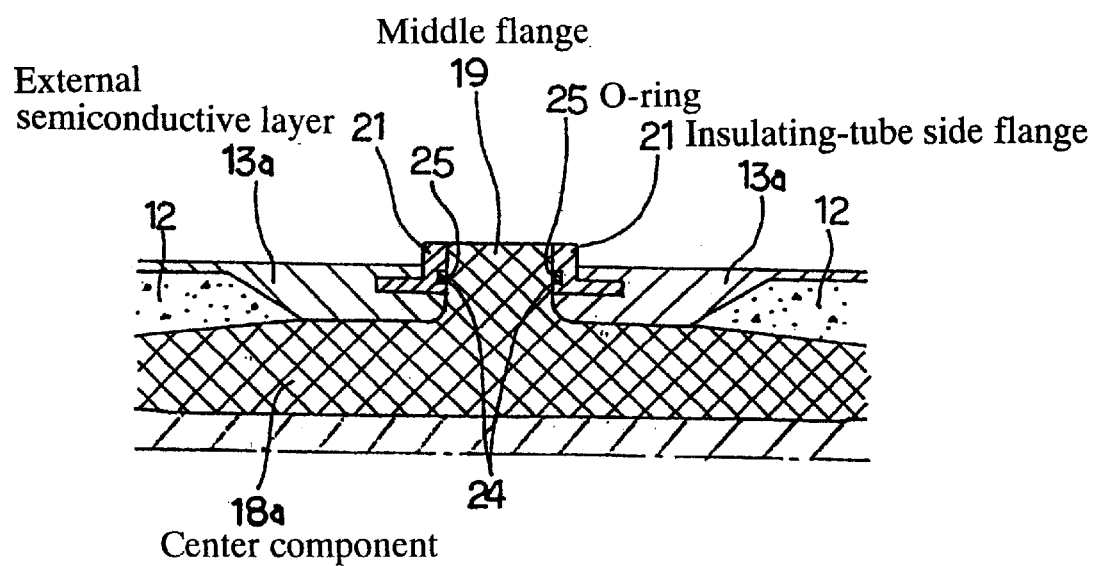
FIG. 3 is an enlarged view of the upper half in the middle part of FIG. 1.
Figure 5:
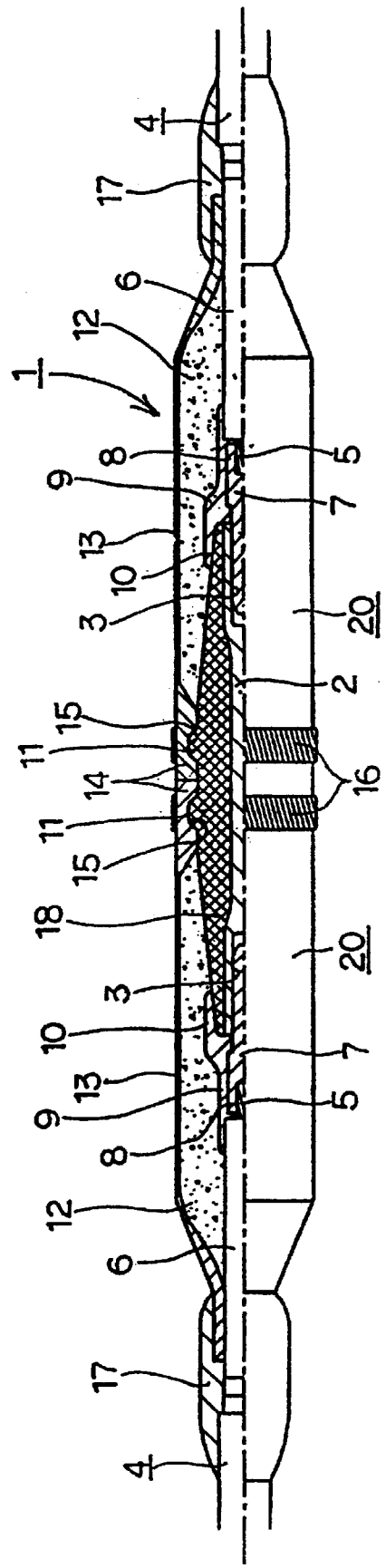
FIG. 5 is a cross-sectional view of one example of the prior art construction.

FIGS. 1 to 3 correspond to claim 1 and claim 2, and show a first example in the embodiment of the invention. The feature of the linear cable connector 1a of this invention is in the construction of the section where the ends of a pair of external semiconductive layers 13a, 13a on the ends of a pair of cables 4, 4 to be connected with each other are connected together with a sufficient seal between them. The construction and function of other sections are substantially the same as in the prior art construction shown in FIG. 5, so the same code numbers will be used for identical parts, and any redundant explanation will be omitted. This explanation will center on the features of this invention.

The center component 18a of the linear cable connector of this invention is made of an insulating material such as synthetic resin, and there is a middle flange 19 formed on the other peripheral surface of its middle section that protrudes outward in the radial direction around its entire circumference. In addition, there are insulating-cylinder side flanges 21, 21 that are formed around the opening ends of external semiconductive layers 13a, 13a of the insulating tubes 20a, 20a. In this embodiment, these insulating-cylinder side flanges 21, 21 are made of a metal such as steel, or from a synthetic resin such as high-functional resin, and they are formed in ring shape having a L-shaped cross section. These insulating-tube side flanges 21, 21 are connected and joined to the tip ends of the aforementioned external semiconductive layers 13a, 13a by molding and thermally-connecting (when the insulating-cylinder side flanges are metal) when forming these external semiconductive layers 13a, 13a, or by bonding them with a separately formed object later. In either method, the contact surface between the insulating-tube side flanges 21, 21 and the external semiconductive layers 13a, 13a is a tight fit all the way around the circumference to form a sure seal.

The shape of the outer peripheral edges of both of the insulating-tube side flanges 21, 21 and the middle flange 19 is square and is such that the corners are curved having a ¼ circular arc. However, the outer peripheral surfaces of the main portion of the center component 18a, and of the tip ends of the external semiconductive layers 13a, 13a are cylindrical. Moreover, as shown in FIG. 2, the four corners of both of the insulating-tube side flanges 21, 21 and the middle flange 19 protrude much further outward in the radial direction than the outer peripheral surfaces of the main portion of the center component 18a, and of the tip ends of the external semiconductive layers 13a, 13a.

There are through holes formed at the four corners of both of the insulating-tube side flanges 21, 21 and the middle flange 19 such that they are aligned with each other, and bolts 22, 22 pass through these holes. Also, there are nuts 23 that screw onto the tip ends of these bolts 22, 22 in the portion that protrudes from the outside surface of the respective insulating-tube side flanges 21, and by tightening them, both of the insulating-tube side flanges 21, 21 and the middle flange 19 are fastened together.

Moreover, there are attachment grooves 24, 24 formed around the circumference on the opposing surfaces of both of the insulating-tube side flanges 21, 21 in a portion further radially inward than the through holes. There are seal rings, that is O-rings 25, 25 that fit inside these attachment grooves 24, 24. These O-rings 25, 25 are elastically compressed between both side surfaces of the middle flange 19 and the respective bottom surfaces of the attachment grooves 24, 24 when both of the insulating-tube side flanges 21, 21 and the middle flange 19 are connected and fixed together by the bolts 22, 22 and nuts 23, to form a seal between the abutting surfaces.

With the linear cable connector of this invention, constructed as described above, a sure seal can be made by the O-ring between the abutting surfaces, specifically between the both side surfaces of the middle flange 19 and the opposing side surfaces of both of the insulating-tube side flanges 21, 21. Particularly, it is possible, regardless of any differences in thermal expansion of the components due to changes in temperature, to prevent gaps from being produced from the outside to the inside of the abutting surfaces. Therefore, even when placed in locations where there is extreme temperature change, such as outdoors, it is possible to maintain a stable seal, to prevent rain water from getting inside and to maintain good insulation over a long period of time. Moreover, disassembly and reconnection work is based on fastening of the bolts 22, 22 and nuts 23, and thus it is easy to disassemble or connect the middle flange 19 and both of the insulating-tube side flanges 21, 21.

Figure 4:
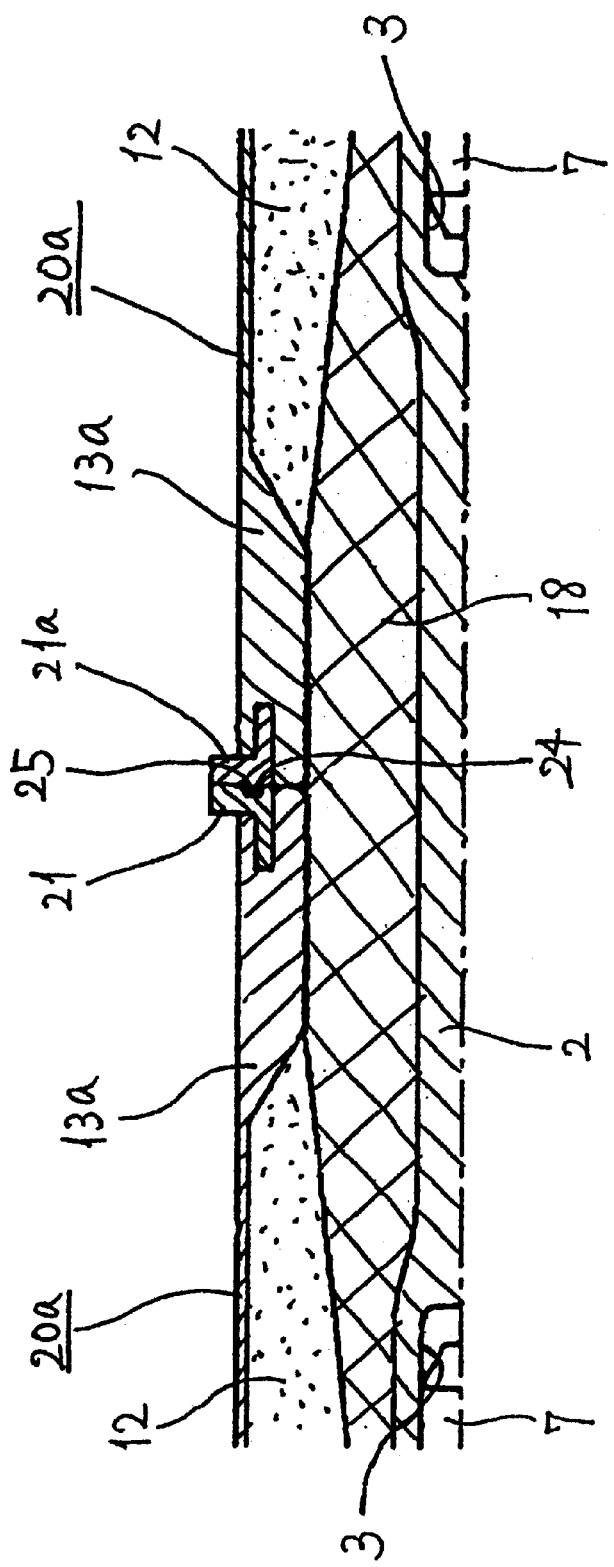
FIG. 4 is a partial cross-sectional view of a second embodiment of the invention.
Figure 6:
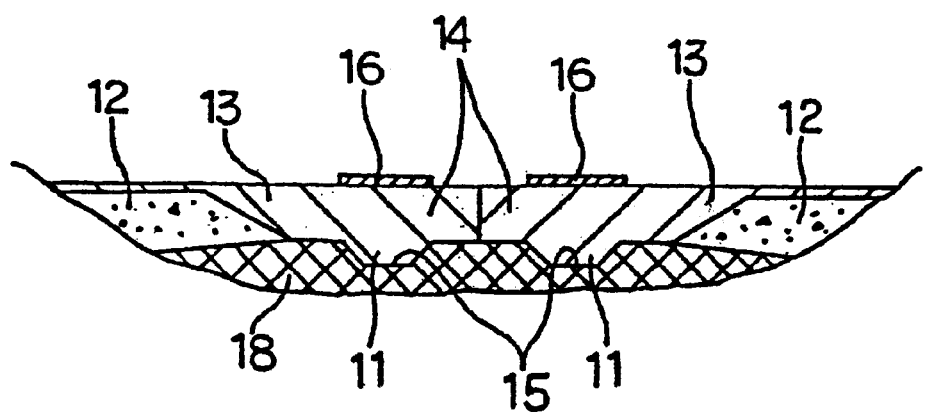
FIG. 6 shows another example of the prior art construction, and is an enlarged view corresponding to the upper half in the middle of FIG. 5.

Next, FIG. 4 corresponds to only claim 1 and shows a second example of the embodiment of the invention. In this example, similar to the prior art construction shown in FIGS. 5 and 6, a center component 18 used does not have a middle flange 19 (see FIGS. 1 and 3). Therefore, in this example, the insulating-tube side flanges 21, 21*a* on the opening ends of the external semiconductive layers 13*a*, 13*a* of the insulating tubes 20*a*, 20*a* are placed directly together (not by way of a middle flange 19). In this example, an attachment groove 24 for attaching to the O-ring is formed on only one of the insulating-tube side flanges 21 (left flange in FIG. 4). The side surface of the other insulating-tube side flange 21*a* (right flange in FIG. 4) that faces the aforementioned insulating-tube side flange 21 is a flat surface.

This pair of insulating-tube side flanges 21, 21*a* have their abutting surfaces directly come together, and the abutting surfaces are sealed by the O-ring 25. The other construction and function is substantially the same as that of the first embodiment described above, so any redundant explanation of identical parts is omitted.

POSSIBILITY OF UTILIZATION IN THE INDUSTRY

This invention is constructed and functions as described above and makes it possible to provide a linear cable connector that is capable of maintaining a sufficient water proofing over a long period of time, even under severe conditions of use such as being placed in locations such as outdoors where it is exposed to wind and rain.

What is claimed is:

1. A linear cable connector comprising:

connection terminals that are made of conductive materials and formed with connection holes on both ends in the axial direction that open up on the both ends;

plugs that are made of conductive material and that have tip ends inserted into the connection holes, and base ends securely fastened to the ends of conductive members forming a pair of cables to be connected together;

a center component that is made of insulating material and that is provided all the way around the connection terminals such that it covers the connection terminals on the circumference thereof; and a pair of insulating tubes that are provided around the ends of the cables and around the plugs, such that both ends of the center component can be freely inserted into the openings on the respective ends of the pair of inserting tubes, wherein the opening ends of this pair of insulating tubes are joined together at the middle section of the center component, the linear cable connector characterized by side flanges that are formed all the way around the opening ends of the insulating tubes, such that the side flanges are fastened together with a seal ring located between the abutting flange surfaces, wherein a middle flange is located generally around the outer peripheral surface in the middle section of the center component such that it protrudes outward in the radial direction, such that the middle flange is held between the abutting surfaces of the side flanges on both of the insulating tubes with seal rings interposed, and that the side flanges on both of the insulating tubes are fastened to the middle flange.

\* \* \* \* \*